(12) United States Patent
Wedin et al.

(10) Patent No.: US 12,428,307 B2
(45) Date of Patent: Sep. 30, 2025

(54) SYSTEM AND PROCESS FOR DIRECT LITHIUM EXTRACTION AND PRODUCTION OF LOW CARBON INTENSITY LITHIUM CHEMICALS FROM GEOTHERMAL BRINES

(71) Applicant: VULCAN ENERGIE RESSOURCEN GMBH, Karlsruhe (DE)

(72) Inventors: Francis Wedin, Karlsruhe (DE); Alexander Grant, Karlsruhe (DE)

(73) Assignee: VULCAN ENERGIE RESSOURCEN GMBH, Karlsruhe (DE)

(*) Notice: Subject to any disclaimer, the term of this patent is extended or adjusted under 35 U.S.C. 154(b) by 305 days.

(21) Appl. No.: 17/995,322

(22) PCT Filed: Apr. 8, 2020

(86) PCT No.: PCT/EP2020/060021
§ 371 (c)(1),
(2) Date: Oct. 3, 2022

(87) PCT Pub. No.: WO2021/204375
PCT Pub. Date: Oct. 14, 2021

(65) Prior Publication Data
US 2023/0159345 A1   May 25, 2023

(51) Int. Cl.
*C01D 15/08* (2006.01)
*B01D 11/04* (2006.01)
(Continued)

(52) U.S. Cl.
CPC .......... *C01D 15/08* (2013.01); *B01D 11/0492* (2013.01); *B01D 15/361* (2013.01);
(Continued)

(58) Field of Classification Search
CPC .... C01D 15/08; C01D 15/02; B01D 11/0492; B01D 15/361; C22B 3/02; C22B 3/42;
(Continued)

(56) References Cited

U.S. PATENT DOCUMENTS

2010/0031652 A1 * 2/2010 Shnell ............... F24T 10/30
                                                60/641.2
2014/0076734 A1   3/2014 Calvo et al.
(Continued)

FOREIGN PATENT DOCUMENTS

| RU | 2650447 | 4/2018 |
|---|---|---|
| WO | WO 94/18121 | 8/1994 |
| WO | WO 2019/191669 | 10/2019 |

OTHER PUBLICATIONS

International Search Report and Written Opinion for International (PCT) Patent Application No. PCT/EP2020/060021, dated Nov. 23, 2020, 11 pages.
(Continued)

*Primary Examiner* — Hoang M Nguyen
(74) *Attorney, Agent, or Firm* — Sheridan Ross P.C.

(57) ABSTRACT

A system and process for direct lithium extraction from geothermal brines, and more particular to the sequential combination of a binary cycle geothermal plant, a direct lithium extraction circuit, a lithium chloride concentration and purification circuit, and a lithium battery chemical processing circuit, for the production of battery-quality lithium hydroxide monohydrate, lithium carbonate or both from geothermal brines. The processing circuits are powered by the electricity and heat produced by the binary cycle geothermal plant without the use of carbon-based fuels. Non-condensable gases that may come out of solution from the geothermal brine are not emitted into the atmosphere.

18 Claims, 11 Drawing Sheets

(51) Int. Cl.
| | |
|---|---|
| *B01D 15/36* | (2006.01) |
| *C01D 15/02* | (2006.01) |
| *C22B 3/02* | (2006.01) |
| *C22B 3/42* | (2006.01) |
| *C22B 26/12* | (2006.01) |
| *F03G 4/00* | (2006.01) |
| *F24T 10/00* | (2018.01) |
| *F24T 10/20* | (2018.01) |

(52) U.S. Cl.
CPC .............. *C01D 15/02* (2013.01); *C22B 3/02* (2013.01); *C22B 3/42* (2013.01); *C22B 26/12* (2013.01); *F03G 4/001* (2021.08); *F03G 4/069* (2021.08); *F24T 10/20* (2018.05); *F24T 10/00* (2018.05)

(58) Field of Classification Search
CPC ......... C22B 26/12; F03G 4/001; F03G 4/069; F24T 10/20; F24T 10/00; Y02E 10/10
See application file for complete search history.

(56) References Cited

U.S. PATENT DOCUMENTS

| | | | |
|---|---|---|---|
| 2014/0301922 | A1 | 10/2014 | Harrison |
| 2014/0366535 | A1 | 12/2014 | Harrison et al. |
| 2018/0222761 | A1 | 8/2018 | Nakano et al. |
| 2019/0039912 | A1 | 2/2019 | Pecoraro et al. |
| 2019/0044126 | A1* | 2/2019 | Snydacker ........... B01D 15/362 |
| 2019/0248667 | A1 | 8/2019 | Featherstone et al. |
| 2019/0256368 | A1 | 8/2019 | Marston et al. |
| 2019/0256987 | A1* | 8/2019 | Snydacker ........... B01D 9/0004 |
| 2019/0390660 | A1 | 12/2019 | McBay |
| 2021/0356178 | A1* | 11/2021 | Novek ................... F25B 15/14 |

OTHER PUBLICATIONS

International Preliminary Report on Patentability for International (PCT) Patent Application No. PCT/EP2020/060021, dated Feb. 16, 2022, 15 pages.

"Dec. 2019 Project Update," Vulcan Energy, Dec. 2019, 12 pages [retrieved online from: https://v-er.eu/announcements/].

"Germany: Vulcan Plans New Geothermal Power Plant for Lithium Extraction Demonstration Project," Global Geothermal News, Feb. 20, 2020, 2 pages [retrieved online from: geothermalresourcescouncil.blogspot.com/2020/02/germany-geothermal_20.html].

"Positive Scoping Study Confirms Potential for Major European Zero Carbon Lithium™ Project," Vulcan Energie Resourcen GMBH, Feb. 21, 2020, ASX Release, 28 pages [retrieved online from www.asx.com.au/asxpdf/20200221/pdf/44f9tjldkj6y1b.pdf].

"Transformational Agreement with Major German Utility at Vulcan Zero Carbon Lithium™ Project," Vulcan Energy, Nov. 26, 2019, 10 pages [retrieved online from: https://v-er.eu/announcements/].

"Vulcan Increases Europe's Largest Lithium Resource," nextinvestors.com, Jan. 20, 2020, 10 pages [retrieved online from: nextinvestors.com/articles/vulcan-increases-europes-largest-lithium-resource/].

Fukuda "Lithium Extraction from Brine with Ion Exchange Resin and Ferric Phosphate," University of British Columbia, Jul. 2019, Master of Applied Science Thesis, 172 pages.

Geothermal Rising "#Germany:@VulcanEnergyRes Plans new #Geothermal Power Plant for #Lithium Extraction Demonstration Project," Twitter, Feb. 21, 2020, 2 pages [retrieved online from: twitter.com/Geo_Rising/status/1230632503477600262].

Richter"Environmentally Friendly direct lithium extraction from geothermal—Interview with Rod Colwell, CEO of Controlled Thermal Resources," ThinkGeoEnergy, Apr. 3, 2020, 3 pages [retrieved online from: www.thinkgeoenergy.com/environmentally-friendly-direct-lithium-extraction-from-geothermal-interview-with-rod-colwell-ceo-of-controlled-thermal-resources/].

Third Party Observations for European Patent Application No. 20718630.5, dated Jan. 13, 2023, 12 pages.

Response to Third Party Observations for European Patent Application No. 20718630.5, dated Feb. 17, 2023, 3 pages.

Third Party Observations for European Patent Application No. 20718630.5, dated Apr. 25, 2023, 10 pages.

English Translation of Notice of Third Party Observation for Korea Patent Application No. 10-2022-7030097, dated Jan. 3, 2024, 51 pages.

* cited by examiner

SYSTEM AND PROCESS FOR DIRECT LITHIUM EXTRACTION AND PRODUCTION OF LOW CARBON INTENSITY LITHIUM CHEMICALS FROM GEOTHERMAL BRINES

CROSS REFERENCE TO RELATED APPLICATIONS

This application is a national stage application under 35 U.S.C. 371 and claims the benefit of PCT Application No. PCT/EP2020/060021 having an international filing date of 8 Apr. 2020, which designated the United States, the disclosure of which is incorporated herein by reference in its entirety.

This invention relates generally to a system and process for direct lithium extraction (DLE) from geothermal brines, and more particularly to the sequential combination of a binary cycle geothermal plant, a DLE circuit, a lithium chloride concentration and purification circuit, and a lithium battery chemical processing circuit for the production of battery-quality lithium hydroxide monohydrate, lithium carbonate or both from geothermal brines.

Lithium can be found in different kinds of natural resources including brines, sedimentary materials, and pegmatitic ores. Brines are aqueous resources which typically contain lithium, sodium, potassium, magnesium, and calcium chlorides in solution with other impurities both cationic and anionic. Lithium can be extracted from brines using two different classes of processing techniques: evaporative processes and DLE processes. Evaporative processes involve pumping brine to the surface to evaporate the water from the brine and crystallize impurity salts in large ponds before lithium is converted into a chemical product at the end of the system. DLE is a process which removes the lithium selectively from the brine while leaving the majority of the water and impurities for re-injection. There are three major classes of DLE: adsorption, ion exchange, and solvent extraction.

Evaporative processes have been mainly deployed to process high lithium concentration, high purity brines in South America where evaporation rates are high. Many other brines exist around the world with lower lithium concentrations and higher impurity concentrations which cannot be processed economically using evaporative processes, but which could be developed in order to supply demand for lithium for lithium ion batteries in electric vehicles. Some of these brines include low grade South American salar brines, oilfield brines, and geothermal brines.

Oilfield and geothermal brines exist in confined aquifers deeper than South American salar brine aquifers, typically greater than about 300 meters deep. This means that they are typically anoxic with oxidation reduction potential (ORP) of less than about 200 mV. Geothermal brines are a class of these brines that are heated to high temperatures and pressures by the Earth's interior, allowing for heat and electricity production from the energy in the brine. Some of these brines contain lithium and it may be economic to extract the lithium from these brines using DLE. However, brine chemistry may need to be modified before the brine enters DLE so that the DLE technology is not impaired by some constituents of the brine, and after the brine is processed in DLE so that it can be re-injected into the aquifer without scaling issues in the well or aquifer itself. This is especially challenging to do for binary cycle geothermal plants which typically are less permissive of changes in physical properties (pH, ORP, composition, temperature, pressure) of the brine before re-injection compared to flash steam geothermal plants.

It is therefore desirable to provide an improved system and process for DLE from geothermal brines, which produces energy using binary cycle geothermal plants.

It is further desirable to provide a sequential combination of a binary cycle geothermal plant, a DLE circuit, a lithium chloride concentration and purification circuit, and a lithium battery chemical processing circuit for the production of battery-quality lithium hydroxide monohydrate, lithium carbonate or both from geothermal brines.

It is still further desirable to provide a system and process for direct lithium extraction from geothermal brines where the DLE circuit utilizes adsorption, ion exchange, ionic liquids, and/or solvent extraction for the production of battery-quality lithium hydroxide monohydrate, lithium carbonate or both from the geothermal brine.

It is yet further desirable to provide a system and process for direct lithium extraction from geothermal brines that co-generates geothermal energy from production wells in order to power the lithium extraction system and process, producing zero carbon electricity and heat, which is used to produce battery-quality lithium hydroxide monohydrate, lithium carbonate or both with no carbon-based fuel input.

Before proceeding to a detailed description of the invention, however, it should be noted and remembered that the description of the invention which follows, together with the accompanying drawings, should not be construed as limiting the invention to the examples (or embodiments) shown and described. Those skilled in the art to which the invention pertains will be able to devise other forms of this invention within the ambit of the appended claims.

In general, the invention relates to a system and process for production of battery-quality lithium hydroxide monohydrate, lithium carbonate, or both from a geothermal brine. The system and process include a binary cycle geothermal plant (can also be referred to as binary cycle geothermal power plant or binary cycle geothermal energy production plant) positioned upstream an optional brine pre-conditioning circuit.

A direct lithium extraction circuit is positioned downstream of the binary cycle geothermal plant and downstream of the optional brine pre-conditioning circuit. The direct lithium extraction circuit is powered by electricity generated from the binary cycle geothermal plant. The direct lithium extraction circuit is configured to selectively recover lithium or lithium chloride from the geothermal brine to produce a lithium chloride concentrate stream.

A lithium chloride concentration and purification circuit is positioned downstream of the direct lithium extraction circuit, and is configured to remove water from the lithium chloride concentrate stream and purify the lithium chloride concentrate stream simultaneously to form an upgraded lithium chloride concentrate stream. The lithium chloride concentration and purification circuit is powered by electricity and/or steam generated from the binary cycle geothermal plant.

The system and process also include a lithium battery chemical processing circuit positioned downstream of the lithium chloride concentration and purification circuit. The lithium battery chemical processing circuit is configured to form a lithium hydroxide stream, or a lithium carbonate stream, or both from the upgraded lithium chloride concentrate. Like the lithium chloride concentration and purification circuit, the lithium battery chemical processing circuit is powered by electricity and heat generated from the binary cycle geothermal plant.

The lithium battery chemical processing circuit can include an electrolysis circuit configured to form a lithium hydroxide concentrate stream from the upgraded lithium chloride concentrate stream. The lithium hydroxide concentrate stream can be passed to a lithium hydroxide processing circuit to produce battery-quality lithium hydroxide monoxide. The lithium hydroxide concentrate stream could also be passed to a $CO_2$ carbonation circuit to produce battery-quality lithium carbonate. Additionally, the lithium battery chemical processing circuit can include a $Na_2CO_3$ carbonation circuit and a lithium carbonate processing circuit to produce battery-grade lithium carbonate from the upgraded lithium chloride concentrate. Moreover, the lithium battery chemical processing circuit can include a $Na_2CO_3$ carbonation and liming circuit and a lithium hydroxide processing circuit to produce battery-grade lithium hydroxide monohydrate.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

These and further aspects of the invention are described in detail in the following examples and accompanying drawings.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments so described.

This invention relates generally to a system and process for direct lithium extraction from geothermal brines, and more particular to a sequential combination of an inhibitor injection circuit, an optional brine pre-conditioning circuit, an optional brine post-conditioning circuit, a binary cycle geothermal plant and heat exchanger to produce zero carbon heat for lithium processing, a DLE circuit, a lithium chloride concentration and purification circuit, and a lithium battery chemical processing circuit for the production of battery-quality lithium hydroxide monohydrate ($LiOH \cdot H_2O$), lithium carbonate ($Li_2CO_3$), or both from geothermal brines.

As illustrated in FIGS. 1 through 5, the geothermal brine is produced from the geothermal reservoir, and generally the physical properties (pH, ORP, composition, temperature, and pressure) of the produced feed brine are the same as the brine which is fed to the DLE circuit but those properties may be changed in the optional pre-conditioning and post-conditioning circuits. Generally, the non-condensable gases such as $CO_2$ are not released into the atmosphere if they are allowed to come out of solution from the brine. This may involve recompression of gases before reinjection.

In some cases, a chemical inhibitor circuit 100 is used to add a chemical inhibitor(s) to the produced geothermal brine to prevent scaling of different metals and salts throughout the system and process. As exemplified throughout the drawings, the chemical inhibitor can be added before the binary cycle geothermal plant 200, or in the alternative, the inhibitor can be added to the geothermal brine stream after the geothermal plant or to any other point in the system and process. The chemical inhibitor may include polyphosphates, phosphate esters, polyacrylic acid derivate, chelating agents such as EDTA, other chemical agents, or a combination of inhibitors. The chemical inhibitors prevent deleterious components in the feed brine from crystallizing or precipitating that are harmful to the binary cycle geothermal plant 200 and direct lithium extraction circuit 400.

The binary cycle geothermal plant 200 may be positioned downstream of the chemical inhibitor circuit 100. Some of the electricity and heat from the binary cycle geothermal plant 200 will be used to power the downstream processing circuits of the system and process, and some of the heat and power from the binary cycle geothermal plant 200 will be sold for district heating, the electricity grid, and other applications. Thermoelectric devices may be used to convert between heat and electricity in the binary cycle geothermal plant 200. In some cases, a heat exchanger can be used in the binary cycle geothermal plant 200 to lower the temperature of the brine to 10-100° C. The heat exchanger can also be used in the binary cycle geothermal plant 200 to produce steam or to heat another heat transfer fluid from the heat of the geothermal brine. In some cases, non-condensable gases are maintained in solution using the flowsheet shown in FIG. 1.

As illustrated in FIGS. 2 through 5, a brine pre-conditioning circuit 300 may be positioned intermediate of the binary cycle geothermal plant 200 and the DLE circuit 400. The brine pre-conditioning circuit 300 provides for "pre-conditioning" to remove deleterious components (e.g., silica, iron, manganese, zinc, aluminum, copper, titanium, barium, lead, and other transition metals, or any other element) as oxides, hydroxides, and oxyhydroxides from the brine stream that are harmful to the DLE circuit 400, such as by clogging of solids or poisoning the adsorptive site in the DLE circuit 400. In some cases, these deleterious components are extracted together and in some cases they are extracted separately.

As exemplified in FIGS. 2 through 5, the pre-conditioning circuit 300 can include a low-pressure flash tank to lower the pressure of the brine. In some cases of pre-conditioning, the pressure is maintained between about 1 to about 40 bar absolute, the temperature is maintained between about 10° C. and about 100° C., the pH is maintained between about 4 to about 8, and the ORP is maintained between about −600 mV to about +800 mV. In some cases, non-condensable gases, which come out of solution from the brine such as $CO_2$, $CH_4$, $H_2S$, and others, are captured, re-compressed, and re-injected into the brine after the DLE circuit 400 and before or after an optional brine post-conditioning circuit 500. As such, these non-condensable gases can be used in the lithium battery chemical processing circuit 800 or can be purified and sold.

As exemplified in FIGS. 2 through 5, the brine feed can be oxidized and/or subject to pH modification in the pre-conditioning circuit 300 in order to selectively precipitate the deleterious components from the brine stream. A base chemical and/or an oxidant is used to pre-condition the brine. Bases that may be used include but are not limited to NaOH, $Ca(OH)_2$, KOH, $Na_2CO_3$, $K_2CO_3$, RbOH, $Mg(OH)_2$, $Sr(OH)_2$, $Ba(OH)_2$, $MgCO_3$, $SrCO_3$, $CO_2$, $Fe(OH)_3$, $Fe(OH)_2$, LiOH or a combination thereof. Oxidants that may be used include but are not limited to, air, $O_2$, $Cl_2$, $H_2O_2$, $KMnO_4$, KOCl, LiOCl, NaOCl, or a combination thereof. In some cases, solutions added in the pre-conditioning circuit 300 are de-oxygenated. In addition, ferric chlorides and other agents can be used to coagulate and seed crystallizations. When precipitates form in the pre-conditioning circuit 300, the solid precipitates are removed using filters, clarifiers, centrifuges or other means to remove solid precipitates from the saline brine stream. In some cases, a recycle stream of precipitates is used to seed crystallization in the pre-conditioning circuit 300. In addition, the temperature and/or the pressure of the brine stream can be modified in the pre-conditioning circuit 300 and before the DLE circuit 400 using heat exchangers, valves, and other equipment.

As illustrated in FIGS. 2-5, the DLE circuit 400 is positioned downstream of the binary cycle geothermal plant 200 and the brine pre-conditioning circuit 300, if present. The DLE circuit 400 utilizes adsorption, ion exchange, ionic liquids, and/or solvent extraction to selectively remove lithium from the geothermal brine stream to create a lithium chloride concentrate stream.

In the DLE circuit 400, the system and process may use a metal oxide ion exchange material, which could include $Li_aTi_bMn_cFe_dSb_eCu_fV_gO_h$ in which [a-f] are numbers between 0 and 1 and h is a number between 1 and 10. The system and process may use a hydrated alumina-based sorbent which may include but is not limited to a manufactured resin-based alumina imbibed adsorbent, a lithium alumina intercalates adsorbent, an alumina imbibed ion exchange resin, or an alumina-based adsorbent. All possible ion exchange materials or adsorbents may or may not be bound by a polymer including but not limited to polyamide, aromatic polyamide, polyvinylamine, polypyrrolidine, polyfuran, polyethersulfone, polysulfone, polypiperzineamide, polybenzimidazoline, polyoxadiazole, acetylated cellulose, cellulose, a polymer with alternative functionalization of sulfonation, carboxylation, phosphorylation, or combinations thereof, other polymeric layer, or combinations thereof. Crown ethers may be used for functionalization of ion exchange materials or sorbents.

The system and process may use an ionic liquid or solvent extraction process, which may include but is not limited to perfluoroethers (PFE), hydrofluoroethers (HFE), perfluoropolyethers (PFPE), hydrofluoropolyethers (HFPE), amines perfluorinated (PFA), preferably ternary (PFTA), hydrofluorinated amines (HFA), preference ternary (HFTA), perfluorinated polyamines (PFPA), polyamines hydrofluorées (HFPA), perfluorothioethers (PFTE), hydrofluorothioethers (HFTE), perfluoropolythioethers (PFPTE), hydrofluoropolythioethers (HFPTEs), hydrofluorothioetherrsamines (HFTEA), perfluoroazacyclohexanes, perfluoroetheramines, hydrofluoroetheramines (HFEA), perfluorothioetheramines, perfluoroethylenes alcohols, perfluorocyclohexanes, hydrofluorocyclohexanes, perfluorodecalins, perfluorocycloethers, hydrofluorocycloethers, perfluorocyclothioethers, hydrofluorocyclothioethers, liquids ionic hydrophobic which can be based on bis(trifluoromethylsulfonyl) imide (TF2N—) ions, and/or other lithium selective liquids or solvent that contains lithium selective functional groups.

In some cases, NaOH, $Na_2CO_3$, $CaCO_3$, $Ca(OH)_2$, KOH, $K_2CO_3$, or other compounds are used to raise the pH of the lithium chloride concentrate stream from about 0.5 to about 5 and/or about 5 to about 13 produced in the DLE circuit 400, and remove any multivalent ions from the lithium chloride concentrate stream. In some cases, flocculation techniques are used to accelerate and promote crystallization of impurities during chemical removal. De-oxygenated water with or without salts, acid, base, $CO_2$, or other chemicals can also be used to remove the lithium from the DLE circuit 400 to create the lithium chloride concentrate stream with lithium concentration between 0.5-10 g/L for further processing in the lithium chloride concentration and purification circuit 600, electrolysis circuit 700 and a lithium battery chemical processing circuit 800 for the production of battery-quality lithium hydroxide monohydrate, lithium carbonate or both from the geothermal brine stream.

In the lithium chloride concentration and purification circuit 600, the lithium chloride concentrate stream is further processed in order to remove water from the lithium chloride concentrate stream and optionally purify the lithium chloride concentrate stream simultaneously. The lithium chloride concentration and purification circuit 600 can include using electro-deionization, reverse osmosis, thermal evaporation, solar evaporation, solar-thermal evaporation, concentrated solar evaporation, evaporation ponds, vacuum distillation, multi-stage flash distillation, multiple-effect distillation, vapor-compression distillation, freeze-thaw methods, electrodialysis, electrodialysis reversal, membrane distillation, a membrane dewatering system, chemical absorption, chemical coordination, mechanical vapor recompression, thermal vapor recompression, single effect evaporators, multiple effect evaporators, blow-down evaporators, vortex evaporation, rotary evaporation, falling film evaporators, forced circulation evaporators, plate evaporators, Oslo type evaporators, or combinations thereof to remove water from the lithium chloride concentrate stream and optionally purify the lithium chloride concentrate stream simultaneously.

The lithium concentration in the lithium chloride concentration and purification circuit 600 increases from between about 0.5 to 10 g/L in the DLE circuit 400 to about 1 to 100 g/L of lithium in the upgraded lithium chloride concentrate stream of the lithium chloride concentration and purification circuit 600. Optionally, freeze-outs, centrifugal techniques, solvent extraction, and other techniques may be used to remove water from the lithium chloride concentrate stream. Ion exchange resins can be used to reduce the concentration of multivalent ions to below 1 ppm, below 100 ppb, or below 10 ppb in the lithium chloride concentrate stream. In some cases, the resins exchange multivalent ions with Na, Li, K, H or other species. In some cases, solvent extraction may be used to upgrade lithium to high purity while separating it from Na and K. In some cases, fractional crystallization may be used to remove Na, K, or other impurity salts in the lithium chloride concentrate stream after evaporation.

The lithium chloride concentrate stream from the lithium chloride concentration and purification circuit 600 is flowed into the lithium battery chemical processing circuit 800. Depending upon the desired form of the battery-quality lithium product, the lithium battery chemical processing circuit 800 can produce battery-quality lithium hydroxide monohydrate (LiOH*$H_2O$), lithium carbonate ($Li_2CO_3$), or both from the lithium chloride concentrate stream.

As exemplified in FIGS. 1 through 5, the lithium battery chemical processing circuit 800 can include an electrolysis circuit 700 that converts lithium salts in the upgraded lithium chloride concentrate stream into lithium hydroxide, which is further crystallized downstream in a lithium hydroxide processing circuit 1100 as lithium hydroxide monohydrate. The electrolysis cell in the electrolysis circuit 700 can be a single compartment or multiple compartment electrochemical or electrolysis cell. The electrochemical cell includes an anode chamber having an anode electrode and a cathode chamber having a cathode electrode. The electrodes can be a mixed metal oxide electrode, gas diffusion electrodes or the like, and the anode chamber and the cathode chamber can be separated by a suitable monopolar or bipolar membrane. The membranes of the electrochemical or electrolysis cell may be a functionalized polymer structure, which may be Nafion®, sulfonated tetrafluoroethylene, sulfonated fluoropolymer, MK-40, co-polymers, different polymers, composites of polymers, other membrane materials, composites, or combinations thereof. The polymer structures of the exchange membrane can be functionalized with sulfone groups, carboxylic acid groups, phosphate groups, other negatively charged functional groups, or combinations thereof. A water-permeable membrane may comprise a fabric, polymeric, composite, or metal support. In some cases, chlorine and hydrogen gases are produced in the electrolysis cell and can be reacted to make HCl. The HCl can either be consumed in the process and/or sold. The HCl can be used to dissolve impurity precipitates in the post-conditioning circuit 500 which are formed in the pre-conditioning circuit 300

Figure 2:
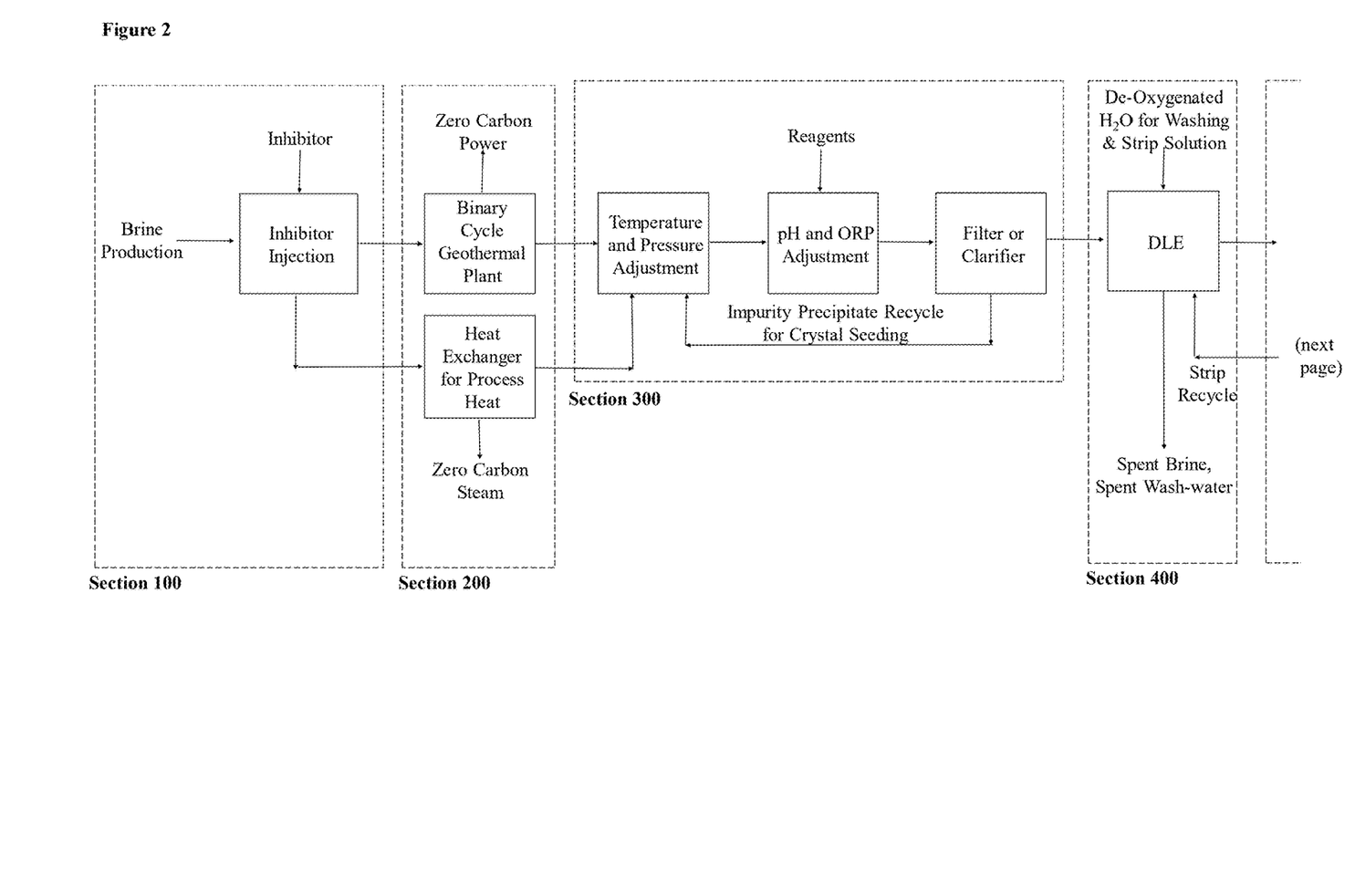
FIG. 2 is a sequential flow chart diagram of another example of a system and process for the production of battery-quality lithium hydroxide monohydrate using direct lithium extraction from geothermal brines with a brine pre-conditioning circuit in accordance with an illustrative embodiment of the invention disclosed herein.

As exemplified in FIG. 2, from the electrolysis circuit 700, the lithium hydroxide stream can be passed to the lithium hydroxide processing circuit 1100 where lithium hydroxide is crystallized as lithium hydroxide monohydrate. In the lithium hydroxide processing circuit 1100, the crystallized lithium hydroxide monohydrate is washed, dried and milled in order to produce battery-quality lithium hydroxide monohydrate.

Figure 3:
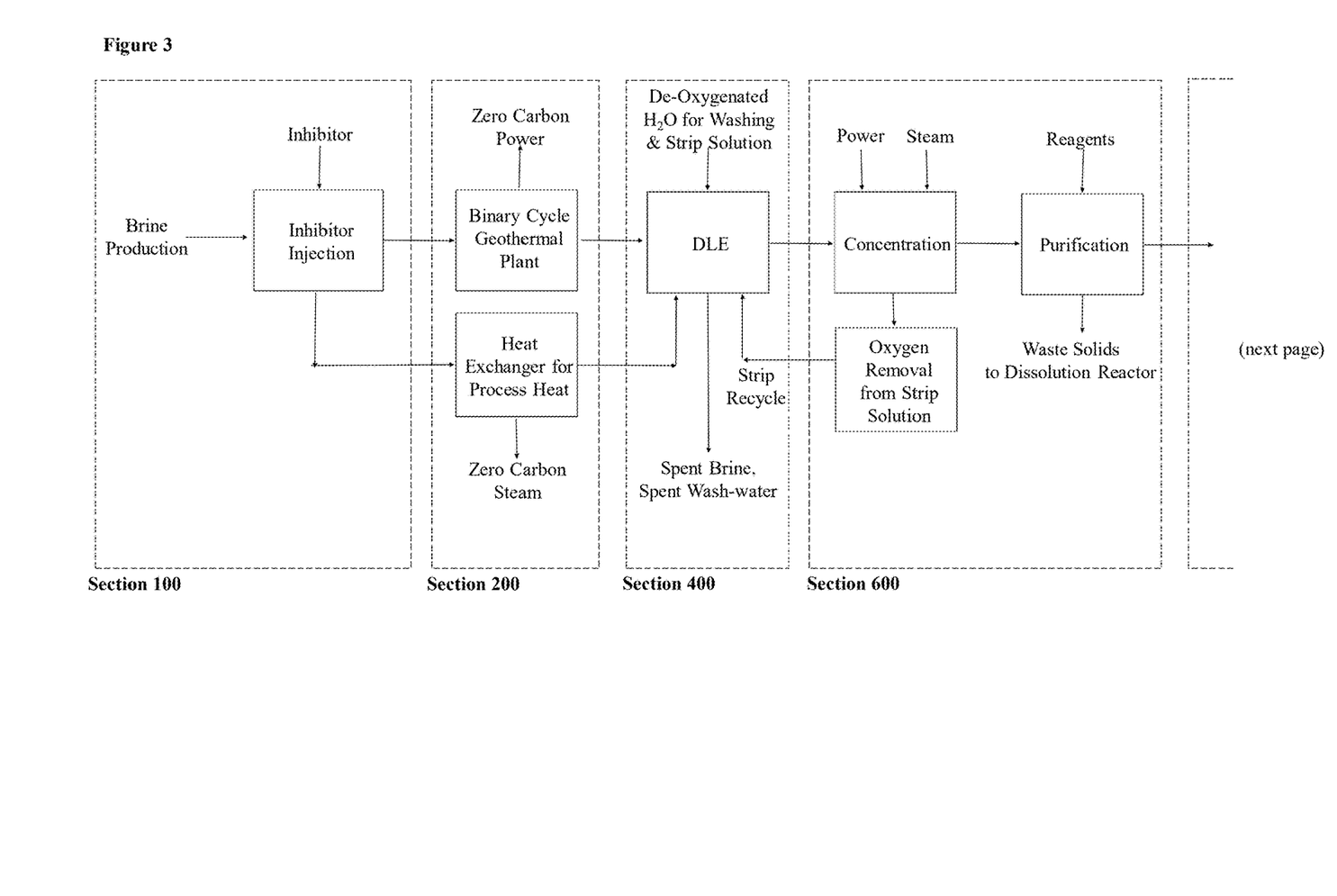
FIG. 3 is a sequential flow chart diagram of another example of a system and process for the production of battery-quality lithium carbonate using direct lithium extraction from geothermal brines with an electrolysis circuit and a carbon dioxide carbonation circuit in accordance with an illustrative embodiment of the invention disclosed herein.

As exemplified in FIG. 3, the lithium battery chemical processing circuit 800 may include a $CO_2$ carbonation and lithium carbonate production circuit 1000 positioned downstream of the electrolysis circuit 700. In this embodiment, the lithium hydroxide concentrate stream from the electrolysis circuit 700 is fed into the $CO_2$ carbonation and lithium carbonate production circuit 1000 in order to form lithium carbonate. The lithium carbonate is then washed, dried and milled in order to produce battery-quality lithium carbonate. The $CO_2$ carbonation circuit 1000 is powered by electricity and heat generated from the binary cycle geothermal plant 200. They do not consume carbon-based fuels.

Figure 4:
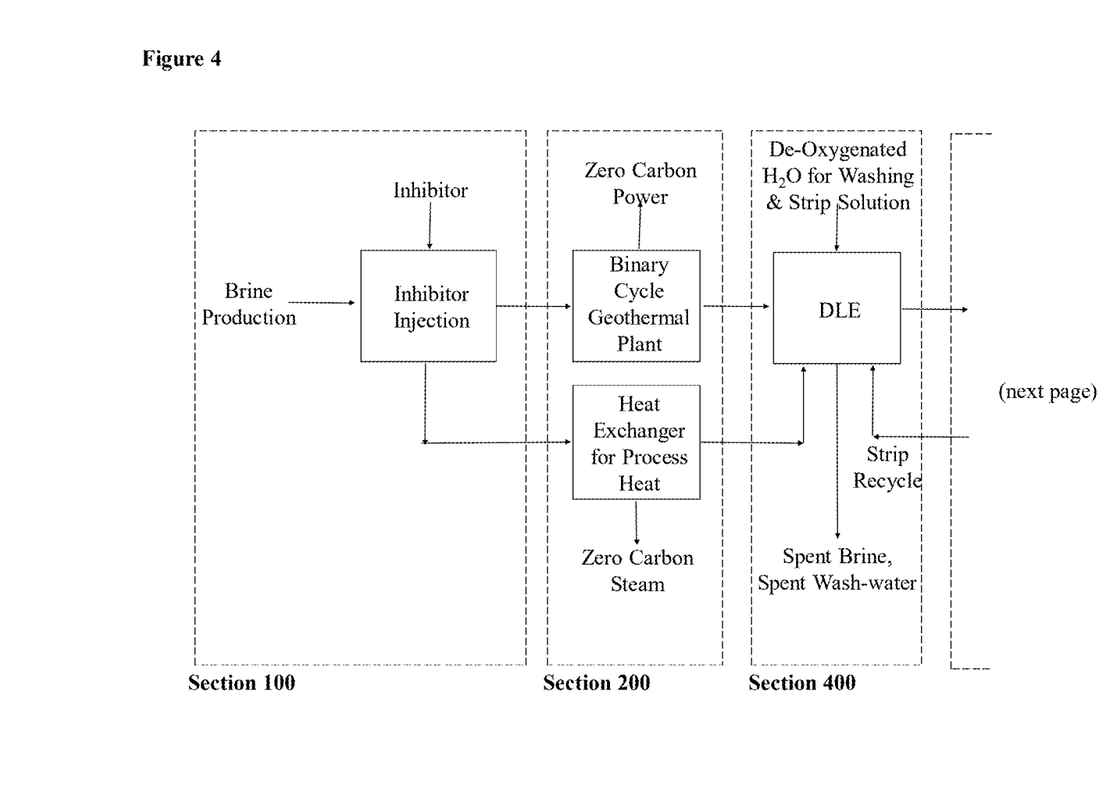
FIG. 4 is a sequential flow chart diagram of another example of a system and process for the production of battery-quality lithium carbonate using direct lithium extraction from geothermal brines with a sodium carbonate carbonation circuit in accordance with an illustrative embodiment of the invention disclosed herein.

As exemplified in FIG. 4, the lithium battery chemical processing circuit 800 includes a $Na_2CO_3$ carbonation circuit 900 positioned downstream of the lithium chloride concentration and purification circuit 600. The $Na_2CO_3$ carbonation circuit 900 is configured to form lithium carbonate from the upgraded lithium chloride concentrate stream of the lithium chloride concentration and purification circuit 600. The lithium carbonate is then washed, dried and milled in a lithium carbonate processing circuit 1300 in order to produce battery-quality lithium carbonate. The $Na_2CO_3$ carbonation circuit 900 and the lithium carbonate processing circuit 1300 are powered by electricity and heat generated from the binary cycle geothermal plant 200. They do not consume carbon-based fuels.

Figure 5:
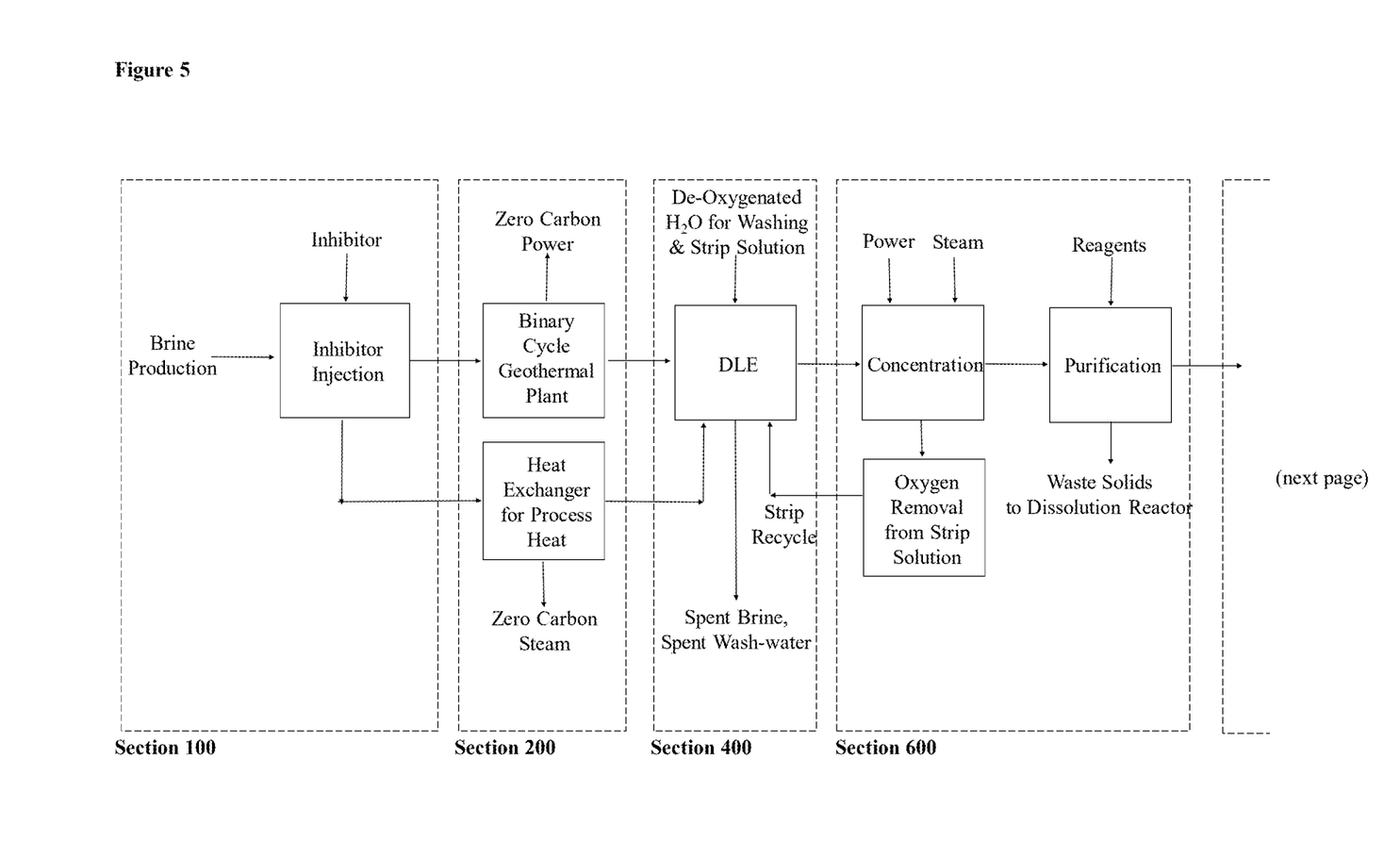
FIG. 5 is a sequential flow chart diagram of another example of a system and process for the production of battery-quality lithium hydroxide monohydrate using direct lithium extraction from geothermal brines with a sodium carbonate carbonation circuit and a liming reactor circuit in accordance with an illustrative embodiment of the invention disclosed herein.
Figure 6:
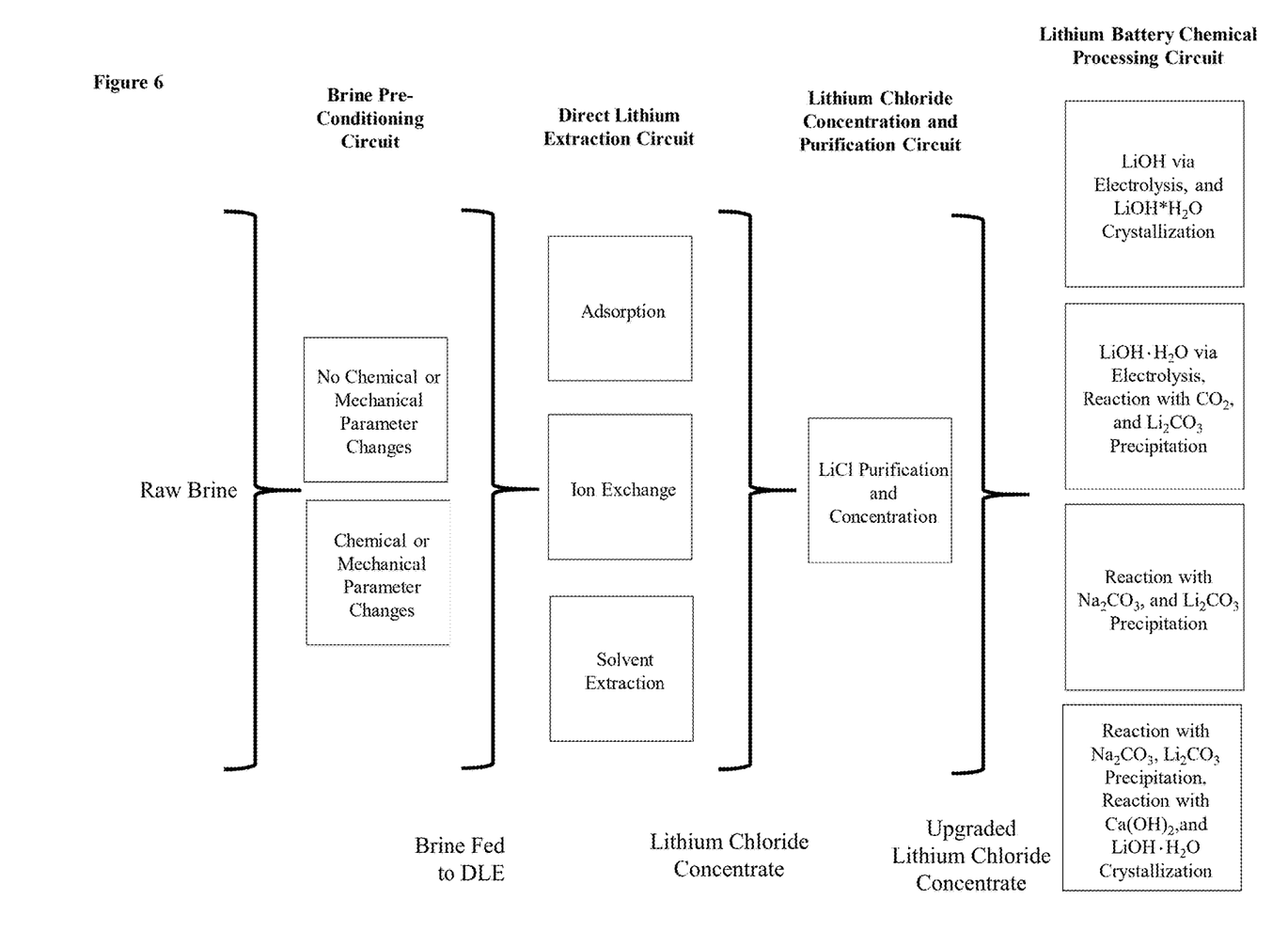
FIG. 6 is a diagram of an example of producing both lithium hydroxide and lithium carbonate battery-quality chemical products in accordance with an illustrative embodiment of the invention disclosed herein.

Turning now to FIG. 5, the lithium battery chemical processing circuit 800 may include a $Na_2CO_3$ carbonation and liming circuit 1200. The upgraded lithium chloride concentrate stream is converted to lithium carbonate using $Na_2CO_3$ carbonation, and then the lithium carbonate is reacted with slaked lime in a liming reactor to make lithium hydroxide. The lithium hydroxide is crystallized downstream as lithium hydroxide monohydrate in the lithium hydroxide processing circuit 1100. The lithium hydroxide monohydrate is then washed, dried and milled in the lithium hydroxide processing circuit 1100 in order to produce battery-quality lithium hydroxide monohydrate. The $Na_2CO_3$ carbonation and liming circuit 1200 and the lithium hydroxide processing circuit 1100 are powered by electricity and heat generated from the binary cycle geothermal plant 200. They do not consume carbon-based fuels.

Figure 1:
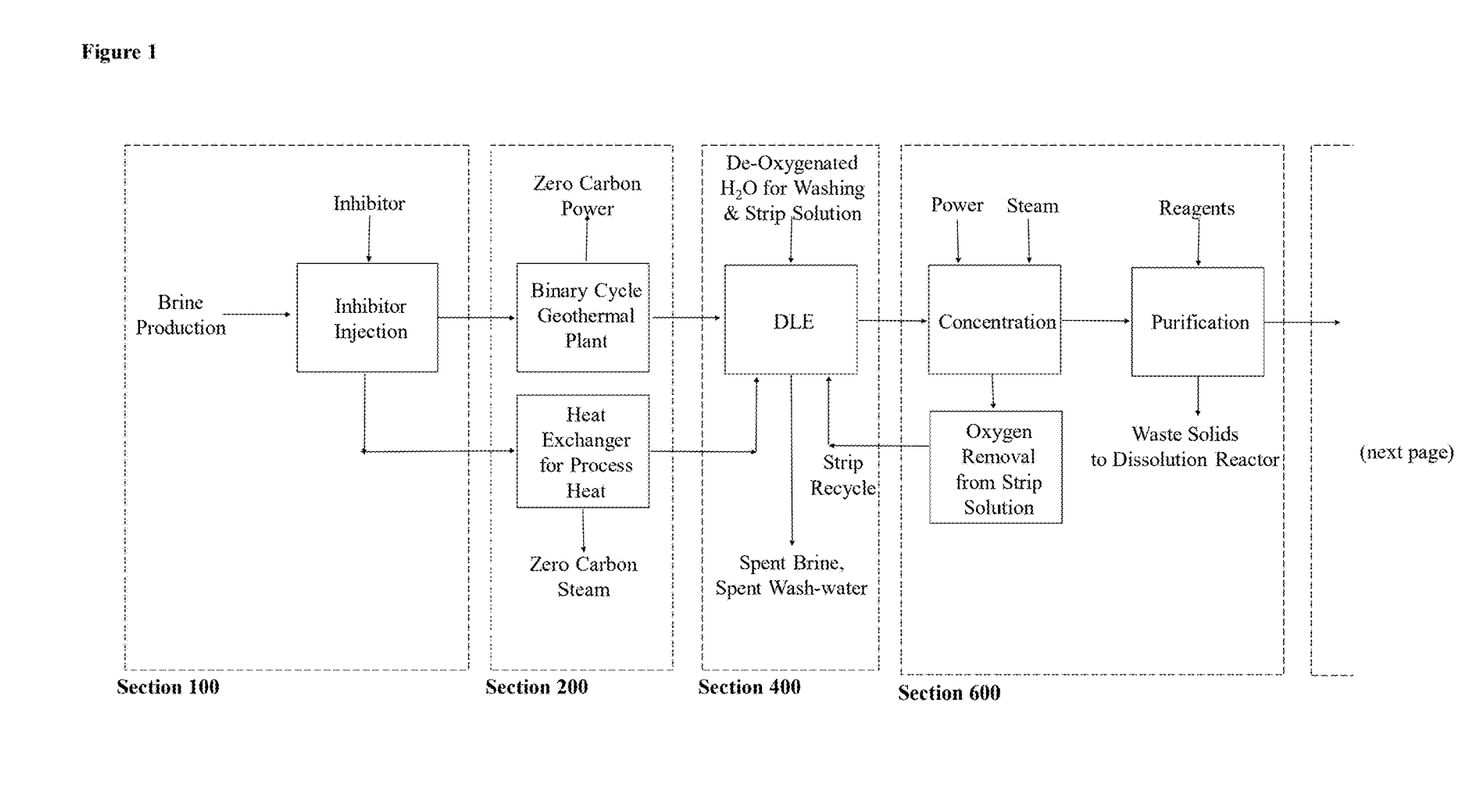
FIG. 1 is a sequential flow chart diagram of an example of a system and process for the production of battery-quality lithium hydroxide monohydrate using direct lithium extraction from geothermal brines without a brine pre-conditioning circuit in accordance with an illustrative embodiment of the invention disclosed herein.

In addition, the upgraded lithium chloride concentrate stream from the lithium chloride concentration and purification circuit 600 could be split with a portion of the concentrate stream passing to the electrolysis circuit 700 to form lithium hydroxide monohydrate as exemplified in FIGS. 1 through 2 or to form lithium carbonate as exemplified in FIG. 3. The other portion of the upgraded lithium chloride concentrate stream could be passed to the $Na_2CO_3$ carbonation circuit 900 to form lithium carbonate as exemplified in FIG. 4 and/or to the $Na_2CO_3$ carbonation and liming circuit 1200 to form lithium hydroxide monohydrate as exemplified in FIG. 5.

The wastes produced in the system and process can be passed to the post-conditioning circuit 500 for dissolution with the addition of acid (e.g., HCl, $H_2SO_4$, $HNO_3$), addition of base, or with no chemical modification before rejection into the geothermal reservoir. In some cases, sulfide salts, bisulfite salts, iron salts, boilers, other oxygen scavenging techniques, and other processes are used to adjust the physical properties of the brine prior to reinjection (pH, ORP, composition, temperature, pressure). The pressure can be adjusted to about 1 bar to about 40 bar of pressure, the temperature adjusted to about 10° C. to about 100° C., the pH corrected to between about 4 and about 8, and ORP corrected to between about −400 mV to about −600 mV.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Systems and processes of the instant disclosure may be implemented by performing or completing manually, automatically, or a combination thereof, selected steps or tasks.

The term "process" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc.

Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a process comprising two or more defined steps, the defined steps can be carried out in any order or simultaneously (except where context excludes that possibility), and the process can also include one or more other steps which are carried out before any of the defined steps, between two of the defined steps, or after all of the defined steps (except where context excludes that possibility).

Still further, additional aspects of the instant invention may be found in one or more appendices attached hereto and/or filed herewith, the disclosures of which are incorporated herein by reference as if fully set out at this point.

Thus, the invention is well adapted to carry out the objects and attain the ends and advantages mentioned above as well as those inherent therein. While the inventive concept has been described and illustrated herein by reference to certain illustrative embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A system for production of battery-quality lithium hydroxide monohydrate, lithium carbonate or both from a geothermal brine, said system comprising:

a binary cycle geothermal plant;

a direct lithium extraction circuit positioned downstream of said binary cycle geothermal plant; said direct lithium extraction circuit configured to selectively recover lithium or lithium chloride from said geothermal brine to produce a lithium concentrate stream; said direct lithium extraction circuit powered by electricity generated from said binary cycle geothermal plant with no carbon-based fuel consumption, wherein said direct lithium extraction circuit is further configured to selectively recover lithium or lithium chloride from said geothermal brine using adsorption to selectively remove lithium from said geothermal brine to form said lithium concentrate stream;

a lithium chloride concentration and purification circuit positioned downstream of said direct lithium extraction circuit; said lithium chloride concentration and purification circuit configured to remove water from said lithium concentrate stream and purify said lithium concentrate stream simultaneously to form an upgraded lithium chloride concentrate stream; said lithium chloride concentration and purification circuit powered by electricity and/or steam generated from said binary cycle geothermal plant with no carbon-based fuel consumption; and a lithium battery chemical processing circuit positioned downstream of said lithium chloride concentration and purification circuit; said lithium battery chemical processing circuit configured to produce battery-quality lithium hydroxide monohydrate, lithium carbonate or both from said upgraded lithium chloride concentrate stream; said lithium battery chemical processing circuit powered by electricity and/or steam generated from said binary cycle geothermal plant with no carbon-based fuel consumption.

2. The system as claimed in claim 1,
further comprising a chemical inhibitor circuit, wherein the binary cycle geothermal plant is positioned downstream from said chemical inhibitor circuit.

3. The system as claimed in claim 1 further comprising a brine pre-conditioning circuit that is configured to remove deleterious components from said geothermal brine as oxides, hydroxides and/or oxyhydroxides; said brine pre-conditioning circuit being positioned intermediate of said binary cycle geothermal plant and said direct lithium extraction circuit,
wherein said brine pre-conditioning circuit is configured to oxidize said geothermal brine and/or modify a pH of said geothermal brine to selectively precipitate said deleterious components from said geothermal brine.

4. The system as claimed in claim 1,
wherein said adsorption uses a manufactured resin-based alumina imbibed adsorbent, a lithium alumina intercalates adsorbent, an alumina imbibed ion exchange resin, or an alumina-based adsorbent,
wherein an ion exchange uses a metal oxide ion exchange material, and/or
wherein a solvent extraction uses perfluoroethers (PFE), hydrofluoroethers (HFE), perfluoropolyethers (PFPE), hydrofluoropolyethers (HFPE), amines perfluorinated (PFA), ternary amines perfluorinated (PFTA), hydrofluorinated amines (HFA), ternary hydrofluorinated amines (HFTA), perfluorinated polyamines (PFPA), polyamines hydrofluorées (HFPA), perfluorothioethers (PFTE), hydrofluorothioethers (HFTE), perfluoropolythioethers (PFPTE), hydrofluoropolythioethers (HFPTEs), hydrofluorothioethersamines (HFTEA), perfluoroazacyclohexanes, perfluoroetheramines, hydrofluoroetheramines (HFEA), perfluorothioetheramines, perfluoroethylenes alcohols, perfluorocyclohexanes, hydrofluorocyclohexanes, perfluorodecalins, perfluorocycloethers, hydrofluorocycloethers, perfluorocyclothioethers, hydrofluorocyclothioethers, liquids ionic hydrophobic which can be based on bis(trifluoromethylsulfonyl) imide (TF2N—) ions.

5. The system as claimed in claim 1,
wherein said lithium battery chemical processing circuit further comprises an electrolysis circuit configured to form a lithium hydroxide concentrate stream from said upgraded lithium chloride concentrate stream of said lithium chloride concentration and purification circuit.

6. The system as claimed in claim 5,
wherein said electrolysis circuit comprises an electrochemical or electrodialysis cell having an anode chamber with an anode electrode and a cathode chamber with a cathode electrode,
and
wherein said electrolysis circuit is powered by electricity and heat generated from said binary cycle geothermal plant with no carbon-based fuel input.

7. The system as claimed in claim 5,
further comprising a lithium hydroxide processing circuit positioned downstream of said electrolysis circuit, said lithium hydroxide processing circuit configured to form lithium hydroxide monohydrate from said lithium hydroxide concentrate stream of said electrolysis circuit.

8. The system as claimed in claim 5,
wherein said lithium battery chemical processing circuit further comprises a $CO_2$ carbonation circuit positioned downstream of said electrolysis circuit, said $CO_2$ carbonation circuit configured to form lithium carbonate from said lithium hydroxide concentrate stream of said electrolysis circuit, and
wherein said $CO_2$ carbonation circuit is powered by electricity and heat generated from said binary cycle geothermal plant with no carbon-based fuel input.

9. The system as claimed in claim 1,
wherein said lithium battery chemical processing circuit further comprises a $Na_2CO_3$ carbonation circuit positioned downstream of said lithium chloride concentration and purification circuit, said $Na_2CO_3$ carbonation circuit configured to form a lithium carbonate concentrate stream from said lithium chloride concentrate stream of said lithium chloride concentration and purification circuit, and
wherein said $Na_2CO_3$ carbonation circuit is powered by electricity and heat generated from said binary cycle geothermal plant with no carbon-based fuel input.

10. The system as claimed in claim 9,
further comprising a lithium carbonate processing circuit positioned downstream of said $Na_2CO_3$ carbonation circuit, said lithium carbonate processing circuit configured to produce battery-quality lithium carbonate from said lithium carbonate concentrate stream.

11. The system as claimed in claim 9,
wherein said $Na_2CO_3$ carbonation circuit further comprises a $Na_2CO_3$ carbonation and liming circuit positioned downstream of said lithium chloride concentration and purification circuit, said $Na_2CO_3$ carbonation and liming circuit configured to form lithium hydroxide from said upgraded lithium chloride concentrate stream of said lithium chloride concentration and purification circuit, and
wherein said $Na_2CO_3$ carbonation and liming circuit is powered by electricity and heat generated from said binary cycle geothermal plant with no carbon-based fuel input.

12. The system as claimed in claim 11,
further comprising a lithium hydroxide processing circuit positioned downstream of said $Na_2CO_3$ carbonation and liming circuit, said lithium hydroxide processing circuit configured to form lithium hydroxide monohydrate from said lithium carbonate concentrate stream of said $Na_2CO_3$ carbonation and liming circuit.

13. The system as claimed in claim 1,
further comprising a brine post-conditioning circuit positioned downstream of said binary cycle geothermal plant, said direct lithium extraction circuit, said lithium chloride concentration and purification circuit, and said lithium battery chemical processing circuit,
wherein said brine post-conditioning circuit is configured to combine wastes produced by said system prior to reinjection of said geothermal brine.

14. A process for production of lithium hydroxide monohydrate, lithium carbonate or both from the geothermal brine using the system of claim 1.

15. The system as claimed in claim 4, wherein said metal oxide ion exchange material comprising $Li_aTi_bMn_cFe_dSb_eCu_fV_gO_h$, wherein [a-f] are numbers between 0 and 1 and h is a number between 1 and 10, or $Li_aTi_bMn_cFe_dSb_eCu_fV_gO_h$, and wherein [a-f] are numbers between 0 and 1 and h is a number between 1 and 10.

16. The system as claimed in claim 6, wherein said electrochemical or electrodialysis cell comprises a single compartment or multiple compartment electrochemical or electrolysis cell.

17. The system as claimed in claim 7, wherein said lithium hydroxide processing circuit is configured to produce the battery-quality lithium hydroxide monohydrate from said lithium hydroxide concentrate stream, and wherein said lithium hydroxide processing circuit is powered by electricity and heat generated from said binary cycle geothermal plant with no carbon-based fuel input.

18. The system as claimed in claim 12, wherein said lithium hydroxide processing circuit is configured to produce the battery-quality lithium hydroxide monohydrate from said lithium hydroxide monohydrate, and wherein said lithium hydroxide processing circuit is powered by electricity and heat generated from said binary cycle geothermal plant with no carbon-based fuel input.

* * * * *